F. FORMHALS.
Machine for Collecting and Condensing Metallic Vapors.
No. 3,043.
Reissued July 21, 1868.
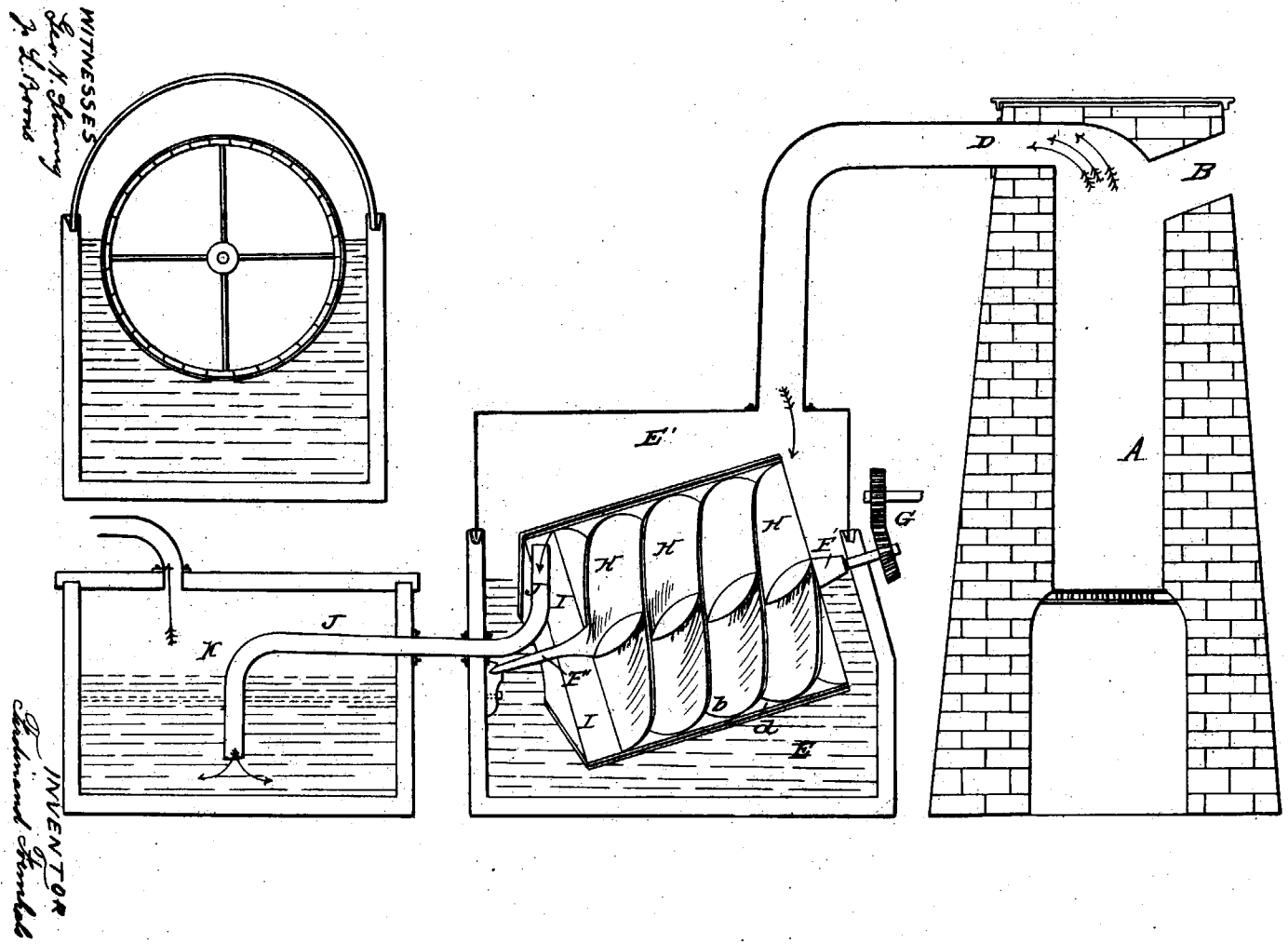
N. PETERS, Photo-Lithographer, Washington, D. C.

UNITED STATES PATENT OFFICE.

FERDINAND FORMHALS, OF SAN FRANCISCO, CALIFORNIA.

IMPROVEMENT IN MACHINES FOR COLLECTING AND CONDENSING METALLIC VAPORS.

Specification forming part of Letters Patent No. 73,519, dated January 21, 1868; reissue No. 3,043, dated July 21, 1868.

*To all whom it may concern:*

Be it known that I, FERDINAND FORMHALS, of the city and county of San Francisco, State of California, have invented an Improved Furnace and Condenser; and I do hereby declare the following description and accompanying drawings are sufficient to enable any person skilled in the art or science to which it most nearly appertains to make and use my said invention or improvements without further invention or experiment.

The nature of my invention consists in combining in the same machine the two principles of smelting or roasting the ore and condensing and saving the volatile substances therein contained, and relates mostly to the reduction of ore containing quicksilver. The name which I apply to my device is the "Cagniardelli Draft Submerger."

The ore or rock, as it is taken from the mine, is placed in a closed furnace and smelted and roasted, the volatile portion and smoke ascending to the top of the furnace, from whence it passes through an eduction-pipe into the top or cover of a tank or box partially filled with water. In the tank is placed, at an incline, a screw formed by a curved spiral flange, which revolves on a central shaft having its bearings in the ends of the tank. At the lower end of the screw is a chamber, through which passes a curved pipe with its mouth upward, reaching to near the top of the water in the chamber, and extending to a condensing-tank near the submerger.

In the accompanying drawings forming a part of this specification, Figure 1 is a side sectional elevation, showing the furnace and pipe which connects it with the submerging-tank. Fig. 2 is an end view of the spiral or submerger.

A is a furnace, provided with a door or feed-opening, B. The top of the furnace is closed, and has leading from it a pipe, D, which extends into the submerging-tank E through the cover E′. This cover is removable, the bottom fitting into a water-channel around the top of the tank, to make it as nearly air-tight as possible and prevent the escape of the fumes. In the tank is placed a submerger or screw, F, turning on its axis, F′, in the ends, the upper end of the shaft passing through the tank, to which is attached gearing G. This screw is so constructed and disposed as to form a continuous spiral opening by a flange or blade, H H H H, which I construct of thin layers of wood or other organic substance, as iron will not answer on account of its affinity for acids, as well as the difficulty of construction, as it is necessary that it should be geometrically correct, and placed around the axis or shaft so that the curvatures and openings will be in proportion, and the whole evenly balanced in its revolution. The screw is placed at an incline in the tank, and around the whole is a wooden cylinder, *b b*, and over this is a sheet-iron cover, *d d*. The spiral does not extend to the lower end of the shaft, and sufficient space is left to form a chamber, I, which opens around the shaft into the tank. A pipe, J, with its mouth upward, is introduced into the chamber above the shaft, and extends to another tank, K, where it is bent downward into water. A little below the surface of the water in this tank is placed a perforated plate, to prevent the fumes from arising too quickly before they are condensed. The interior of the submerging-tank and cover E′, as well as the screw, should be submerged in hot asphaltum before use, to fill up any holes or crevices and render the whole as nearly air and water tight as possible.

I describe the operation of my machine as follows, that is to say: The ore is placed in the furnace, above the fire-grate, and water introduced into the tank E, allowing it to rise a little above the upper end of the screw-shaft, and the screw set in motion by the gearing or other device, which draws the heat up through the ore, and, with the smoke and volatile vapors, by the connecting-pipe, into the submerging-tank, at the same time running fresh supplies of oxygen through the draft-hole beneath the fire-grate of the furnace. From the top of the submerging-tank the fumes are taken by the screw and drawn under water, passing through the spiral opening or openings into the chamber below. From this point the machine or screw becomes a forcing power to force the fumes through the pipe J to the condensing tank or tanks. More than one condensing-tank may be employed, and the acid and other volatile vapors from the ores condensed, if desired; but from the first tank, stationed near the submerging-tank, the most of the quicksilver or metallic substances will be found, although an occasional cleaning up may be found necessary from the submerging-tank.

Having thus described my invention, what I claim, and desire to secure by Letters Patent, is—

1. In combination with the furnace A, the screw or submerger F, formed by a covered spiral flange or blade, H H, around a central shaft or axis, substantially as and for the purpose described.

2. Drawing the volatile substances from the furnace into the submerging-tank E by the screw F, from thence along the spiral opening to the chamber I, and out through the pipe J to the condensing tank or tanks, substantially as described.

In witness whereof I have hereunto set my hand and seal.

FERDINAND FORMHALS. [L. S.]

Witnesses:
J. L. BOONE,
GEO. H. STRONG.